(12) United States Patent
Kitchen et al.

(10) Patent No.: US 8,335,904 B1
(45) Date of Patent: Dec. 18, 2012

(54) IDENTIFYING ACTIVE AND INACTIVE DATA IN STORAGE SYSTEMS

(75) Inventors: John Kitchen, Westborough, MA (US); Amnon Naamad, Brookline, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 803 days.

(21) Appl. No.: 12/317,910

(22) Filed: Dec. 30, 2008

(51) Int. Cl.
G06F 12/00 (2006.01)
G06F 13/00 (2006.01)
G06F 13/28 (2006.01)
G06F 7/00 (2006.01)
G06F 17/30 (2006.01)

(52) U.S. Cl. . 711/170; 711/154; 711/173; 711/E12.001; 707/797

(58) Field of Classification Search .................. 711/154, 711/170, 173, E12.001; 707/797
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 2003/0145186 A1* | 7/2003 | Szendy et al. | 711/173 |
| 2006/0069887 A1 | 3/2006 | LeCrone et al. | |
| 2009/0070541 A1 | 3/2009 | Yochai | |

OTHER PUBLICATIONS

U.S. Appl. No. 11/823,156, filed Jun. 27, 2007, Burke, et al.
U.S. Appl. No. 11/823,152, filed Jun. 27, 2007, Burke.
U.S. Appl. No. 11/903,869, filed Sep. 25, 2007, Veprinsky, et al.

* cited by examiner

*Primary Examiner* — Michael Alsip
(74) *Attorney, Agent, or Firm* — Muirhead and Saturnelli, LLC

(57) ABSTRACT

Measuring access rates of a computer memory include subdividing the memory into subsections, monitoring access rates for each of the subsections, in response to a subsection having a relatively high access rate, subdividing the subsection into multiple subsections that are separately monitored, and, in response to at least two adjacent subsections having a relatively low access rate, merging the at least two subsections into a single subsection. Monitoring access rates may include monitoring at least one of the following operational parameters: number of data accesses, number of cache accesses, number of cache misses, number of read accesses, number of write accesses, and ratio of read accesses to write accesses. Two or more operational parameters may be used and the operational parameters may be weighted.

15 Claims, 11 Drawing Sheets

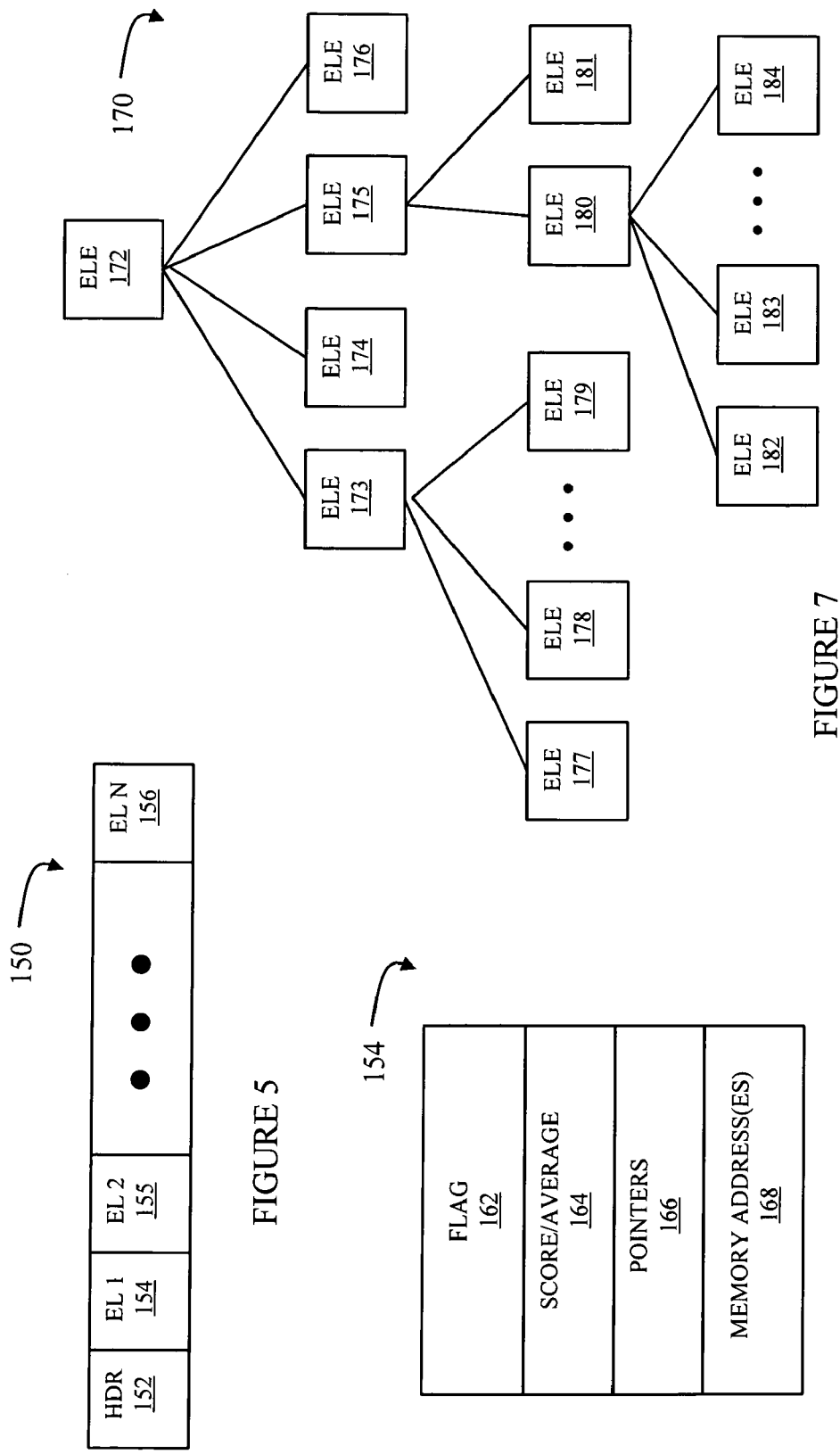

IDENTIFYING ACTIVE AND INACTIVE DATA IN STORAGE SYSTEMS

BACKGROUND OF THE INVENTION

1. Technical Field

This application relates to computer storage devices, and more particularly to the field of determining access rates of different portions of storage devices.

2. Description of Related Art

Host processor systems may store and retrieve data using a storage device containing a plurality of host interface units (host adapters), disk drives and other physical storage, and disk interface units (disk adapters). Such storage devices are provided, for example, by EMC Corporation of Hopkinton, Mass., and disclosed in U.S. Pat. No. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the physical storage of the storage device directly, but rather, access what appears to the host systems as a plurality of logical volumes. The logical volumes may or may not correspond to the actual disk drives and/or other physical storage.

In some cases, it may be useful to provide multiple tiers of physical storage where each tier corresponds to memory storage having a particular speed associated therewith. Note that faster memory is usually more expensive, so it is often more cost effective to combine fast and slow memory. System throughput may be improved by placing data that is more frequently accessed in relatively faster physical storage. However, conventional techniques for monitoring data accesses may not be useful in very large systems. For example, in a system with one terabyte of storage, a table for monitoring megabyte chunks of the memory would have one million entries. On the other hand, increasing the size of the chunks, while decreasing the table size, may make the chunks too big to be able to ascertain useful access frequency information. For example, a gigabyte chunk may have a relatively dormant section and a relatively active section. In such a case, the chunk may be treated as having a medium access rate, even though this is not true for either subsection. In addition, monitoring data on a per file basis may not be useful, since in some cases it is possible to have some portions of files be significantly more active than other portions, especially in the case of relatively large files.

Accordingly, it is desirable to provide a mechanism that can obtain and use information about data access rates in a way that does not require a large table of entries but still addresses granularity issues associated with chunks that are too large.

SUMMARY OF THE INVENTION

According to the system described herein, measuring access rates of a computer memory include subdividing the memory into subsections, monitoring access rates for each of the subsections, in response to a subsection having a relatively high access rate, subdividing the subsection into multiple subsections that are separately monitored, and, in response to at least two adjacent subsections having a relatively low access rate, merging the at least two subsections into a single subsection. Monitoring access rates may include monitoring at least one of the following operational parameters: number of data accesses, number of cache accesses, number of cache misses, size of access in bytes, number of read accesses, number of write accesses, and ratio of read accesses to write accesses. Two or more operational parameters may be used and the operational parameters may be weighted. Measuring access rates of a computer memory may also include maintaining a plurality of elements, each of which corresponds to one of the subsections. The elements may be arranged in a tree-like structure. Each of the elements may include information indicating a portion of the computer memory corresponding to the subsection. Merging the subsections may include combining elements and combining information indicating the portion of computer memory from each element that is being combined. Subdividing the subsection may include creating new elements each having information indicating the portion of computer memory corresponding to the subsection that is based on information indicating the portion of computer memory corresponding to the subsection from the element being subdivided.

According further to the system described herein, arranging data in a computer memory includes providing at least two types of memory for the computer memory, where one of the types is relatively fast and another one of the types is relatively slow, moving data that is accessed relatively frequently from the relatively slow memory type to the relatively fast memory type, moving data that is accessed relatively infrequently from the relatively fast memory type to the relatively slow memory type, and measuring data access rates to determine data that is accessed relatively frequently and relatively infrequently, where measuring data access rates includes subdividing the memory into subsections, monitoring access rates for each of the subsections, in response to a subsection having a relatively high access rate, subdividing the subsection into multiple subsections that are separately monitored, and, in response to at least two adjacent subsections having a relatively low access rate, merging the at least two subsections into a single subsection. Monitoring access rates may include monitoring at least one of the following operational parameters: number of data accesses, number of cache accesses, number of cache misses, size of access in bytes, number of read accesses, number of write accesses, and ratio of read accesses to write accesses. Two or more operational parameters may be used and the operational parameters may be weighted. Arranging data in a computer memory may also include maintaining a plurality of elements, each of which corresponds to one of the subsections. The elements may be arranged in a tree-like structure. Each of the elements may include information indicating a portion of the computer memory corresponding to the subsection. Merging the subsections may include combining elements and combining information indicating the portion of computer memory from each element that is being combined. Subdividing the subsection may include creating new elements, each having information indicating the portion of computer memory corresponding to the subsection that is based on information indicating the portion of computer memory corresponding to the subsection from the element being subdivided.

According further to the system described herein, computer software, provided in a computer-readable medium, measures access rates of a computer memory. The software includes executable code that subdivides the memory into subsections, executable code that monitors access rates for each of the subsections, executable code that subdivides the subsection into multiple subsections that are separately monitored in response to a subsection having a relatively high access rate, and, executable code that merges at least two subsections into a single subsection in response to the at least two adjacent subsections having a relatively low access rate. Executable code that monitors access rates may monitor at least one of the following operational parameters: number of data accesses, number of cache accesses, number of cache misses, size of access in bytes, number of read accesses, number of write accesses, and ratio of read accesses to write accesses. The computer software may also include executable code that maintains a plurality of elements, each of which corresponds to one of the subsections. The elements may be arranged in a tree-like structure.

BRIEF DESCRIPTION OF DRAWINGS

Embodiments of the system are described with reference to the several figures of the drawings, noted as follows.

FIG. 5 is a schematic diagram illustrating a table for containing elements used for monitoring memory accesses according to an embodiment of the system described herein.

FIG. 6 is a schematic diagram of an element used for monitoring memory accesses according to an embodiment of the system described herein.

FIG. 7 is a diagram illustrating a tree-like structure of elements used for monitoring memory accesses according to an embodiment of the system described herein.

DETAILED DESCRIPTION OF VARIOUS EMBODIMENTS

Figure 1:
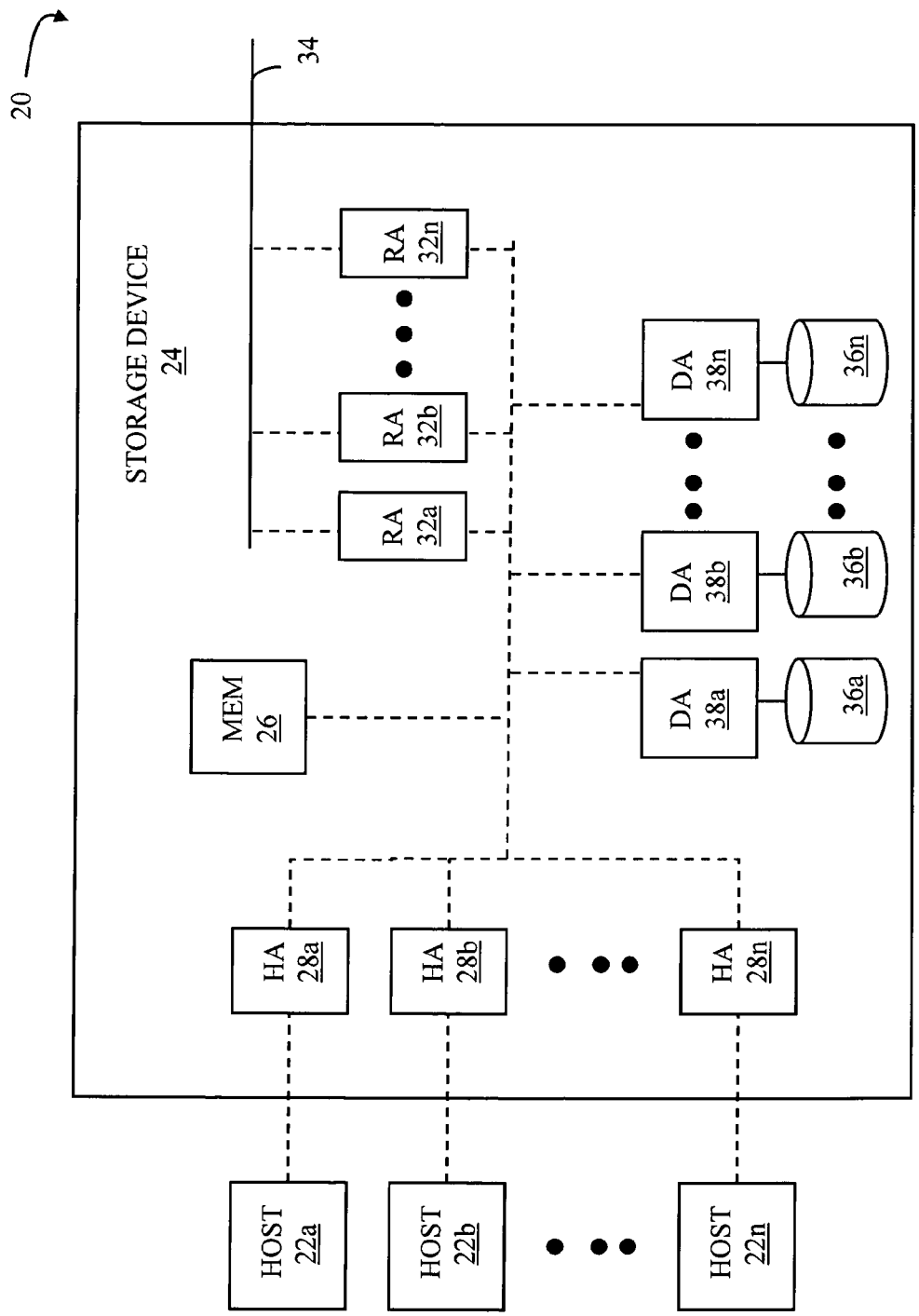
FIG. 1 is, a schematic diagram showing a plurality of hosts and a data storage device that may be used in connection with the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a diagram 20 shows a plurality of hosts 22a-22n coupled to a data storage device 24. The data storage device 24 includes an internal memory 26 that facilitates operation of the storage device 24 as described elsewhere herein. The data storage device also includes a plurality of host adapters (HAs) 28a-28n that handle reading and writing data between the hosts 22a-22n and the storage device 24. Although the diagram 20 shows each of the hosts 22a-22n coupled to each of the HAs 28a-28n, it will be appreciated by one of ordinary skill in the art that one or more of the HAs 28a-28n may be coupled to other hosts and that one of the hosts 22a-22n may be coupled to more than one of the HAs 28a-28n.

The storage device 24 may include one or more Remote Data Facility (RDF) adapter units (RAs) 32a-32n. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RAs 32a-32n are coupled to an RDF link 34 and the RAs 32a-32n are similar to the HAs 28a-28n, but are used to transfer data between the storage device 24 and other storage devices (not shown) that are also coupled to the RDF link 34. The storage device 24 may be coupled to additional RDF links (not shown in FIG. 1) in addition to the RDF link 34. For further discussion of RDF and the use thereof in data recovery and storage techniques, see U.S. Pat. No. 5,742,792, which is incorporated by reference herein, and U.S. Patent App. Pub. No. 2006-0069887 to LeCrone, et al., entitled "Triangular Asynchronous Replication," which is incorporated herein by reference.

The storage device 24 may also include one or more disk drives 36a-36n (disk assemblies), each containing a different portion of data stored on the storage device 24. The disk drives 36a-36n should be understood as representing any appropriate type of storage media, including, without limitation, DRAM cache, flash or other solid-state storage device, tape, optical media, and/or any combination of permanent, semi-permanent and temporally-limited storage media. Each of the disk drives 36a-36n may be coupled to a corresponding one of a plurality of disk adapter units (DA) 38a-38n that provides data to a corresponding one of the disk drives 36a-36n and receives data from a corresponding one of the disk drives 36a-36n. Note that, in some embodiments, it is possible for more than one disk drive to be serviced by a DA and that it is possible for more than one DA to service a particular disk drive.

The storage space in the storage device 24 that corresponds to the disk drives 36a-36n may be subdivided into a plurality of volumes or logical storage devices. The logical storage devices may or may not correspond to the physical storage space of the disk drives 36a-36n. Thus, for example, the disk drive 36a may contain a plurality of logical storage devices or, alternatively, a single logical storage device could span both of the disk drives 36a, 36b. The hosts 22a-22n may be configured to access any combination of logical storage devices independent of the location of the logical storage devices on the disk drives 36a-36n. A device, such as a logical storage device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk drive. Other embodiments may use different structures.

One or more internal logical data path(s) exist between the DAs 38a-38n, the HAs 28a-28n, the RAs 32a-32n, and the memory 26. In some embodiments, one or more internal busses and/or communication modules may be used. In some embodiments, the memory 26 may be used to facilitate data transferred between the DAs 38a-38n, the HAs 28a-28n and the RAs 32a-32n. The memory 26 may contain tasks that are to be performed by one or more of the DAs 38a-38n, the HAs 28a-28n and the RAs 32a-32n, and a cache for data fetched from one or more of the disk drives 36a-36n. Use of the memory 26 is described in more detail hereinafter.

The storage device 24 may be provided as a stand-alone device coupled to the hosts 22a-22n as shown in FIG. 1 or, alternatively, the storage device 24 may be part of a storage area network (SAN) that includes a plurality of other storage devices as well as routers, network connections, etc. The storage device 24 may be coupled to a SAN fabric and/or be part of a SAN fabric. The storage device 24 may be a NAS. The system described herein may be implemented using software, hardware, and/or a combination of software and hardware where software may be stored in an appropriate storage medium and executed by one or more processors.

Figure 2:
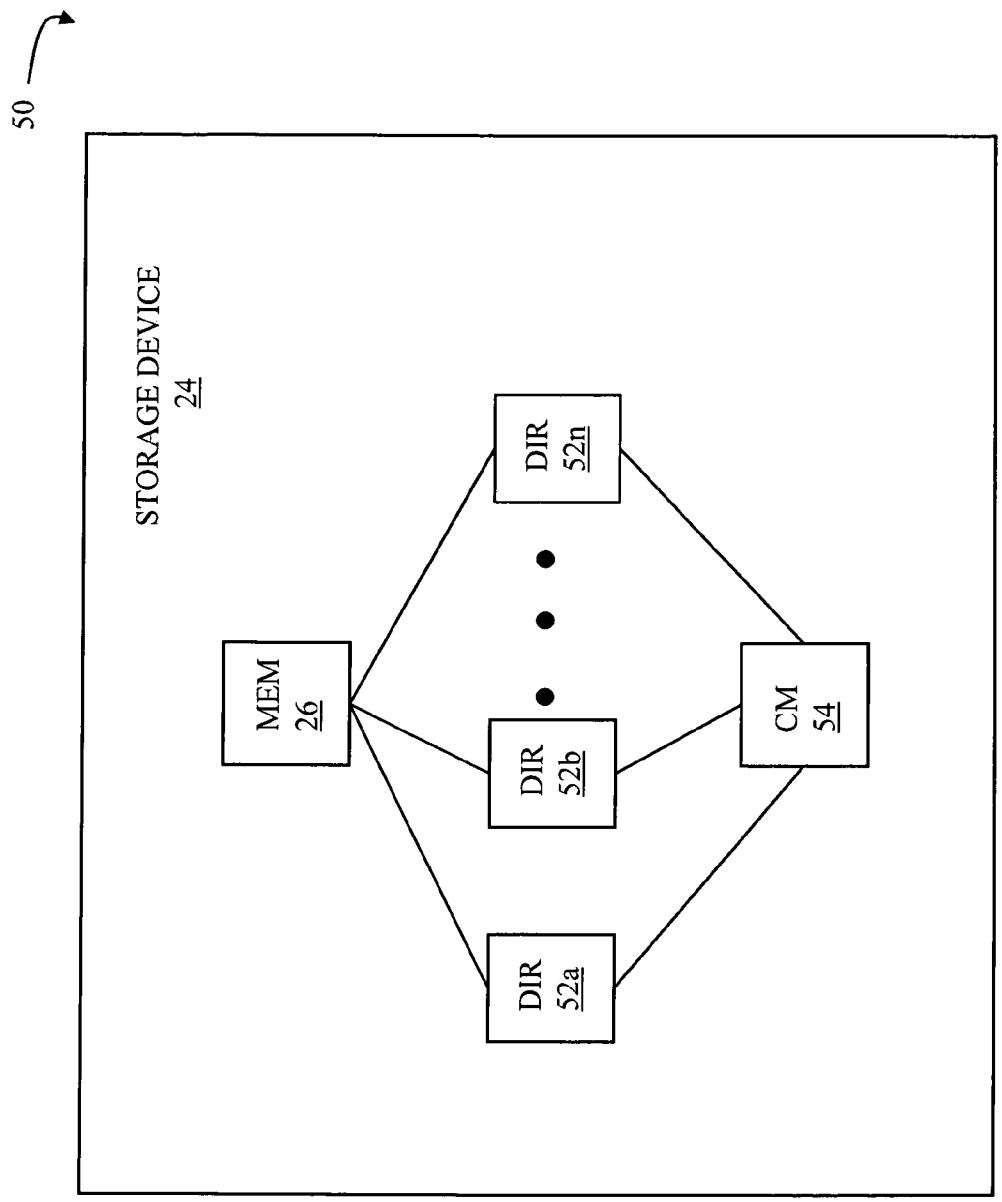
FIG. 2 is a schematic diagram showing a storage device, memory, a plurality of directors, and a communication module that may be used in connection with the system described herein.

Referring to FIG. 2, a diagram 50 illustrates an embodiment of the storage device 24 where each of a plurality of directors 52a-52n are coupled to the memory 26. Each of the directors 52a-52n represents one of the HAs 28a-28n, RAs 32a-32n, or DAs 38a-38n. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52n. Each of the directors 52a-52n may be coupled to the CM 54 so that any one of the directors 52a-52n may send a message and/or data to any other one of the directors 52a-52n without needing to go through the memory 26. The CM 54 may be implemented using conventional MUX/router technology where a sending one of the directors 52a-52n provides an appropriate address to cause a message and/or data to be received by an intended receiving one of the directors 52a-52n. Some or all of the functionality of the CM 54 may be implemented using one or more of the directors 52a-52n so that, for example, the directors 52a-52n may be interconnected directly with the interconnection functionality being provided on each of the directors 52a-52n. In addition, a sending one of the directors 52a-52n may be able to broadcast a message to all of the other directors 52a-52n at the same time.

In some embodiments, one or more of the directors 52a-52n may have multiple processor systems thereon and thus may be able to perform functions for multiple directors. In some embodiments, at least one of the directors 52a-52n having multiple processor systems thereon may simultaneously perform the functions of at least two different types of directors (e.g., an HA and a DA). Furthermore, in some embodiments, at least one of the directors 52a-52n having multiple processor systems thereon may simultaneously perform the functions of at least one type of director and perform other processing with the other processing system. In addition, all or at least part of the global memory 26 may be provided on one or more of the directors 52a-52n and shared with other ones of the directors 52a-52n.

Figure 3:
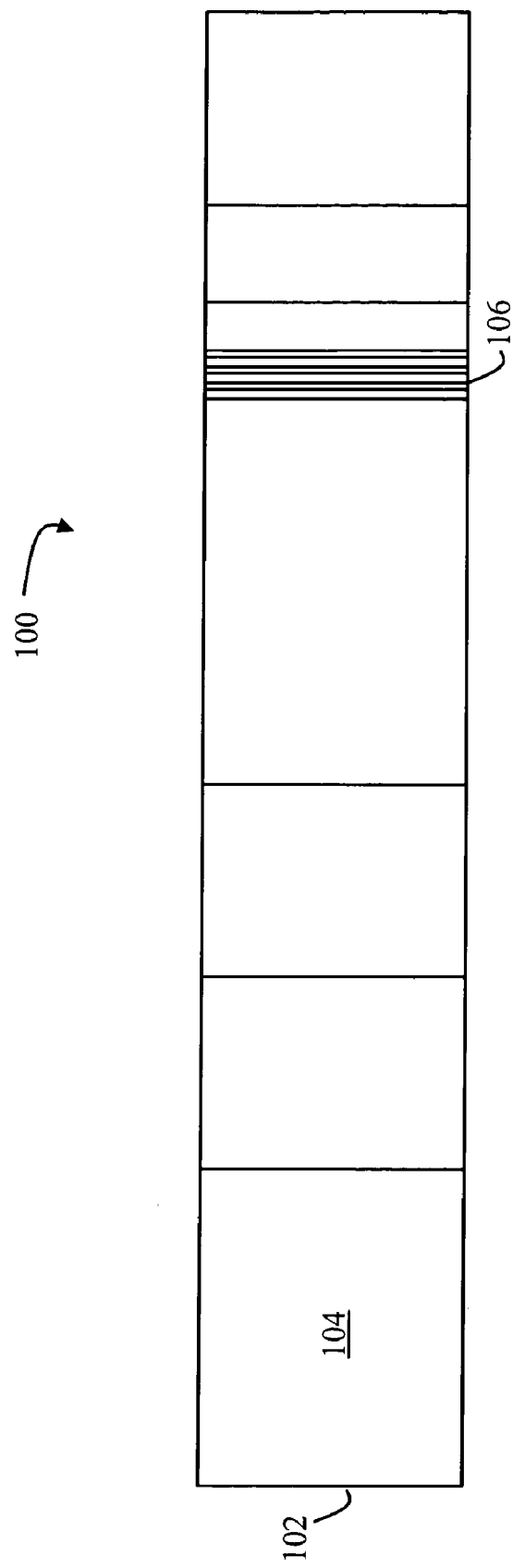
FIG. 3 is a schematic diagram illustrating a memory divided into subsections for monitoring accesses thereto according to an embodiment of the system described herein.

Referring to FIG. 3, a memory storage area 102 of a memory storage device 100 may be subdivided into different sections for monitoring accesses thereto. The memory storage area may represent any appropriate type of physical computer memory data storage in accordance with the system described herein. In an embodiment herein, the memory storage area 102 is a disk storage array that includes disks of varying speeds/capacities and possibly includes other types of storage devices, such as flash memory. Note that faster memory may be more expensive so that it may be desirable to move data that is accessed more frequently into the faster memory and to move data that is accessed less frequently into slower memory. The system described herein provides a mechanism for monitoring portions of the memory storage area 102 in a way that facilitates deciding where to move the data within the memory storage device 100.

As shown in FIG. 3, the monitored sections of the memory storage device 100 may be of different sizes so that, for example, the monitored section 104 is larger (represents more data storage capacity) than the monitored section 106. As described in more detail elsewhere herein, the sizes of the monitored sections may be dynamically adjusted based on the amount of activity (accesses) so that, in response to a relatively high amount of activity, subsections are further subdivided into multiple subsections and, in response to a relatively low amount of activity, subsections are merged. This is explained in more detail elsewhere herein.

Referring to FIGS. 4A-4D, a series of diagrams 110, 120, 130, 140 illustrate changes in configuration of subsections for a memory with the passage of time. Each of the diagrams 110, 120, 130, 140 represents a subsection configuration of the same memory at a different point in time. The memory may represent a single disk drive, a disk array, flash memory, a combination of memory types, or any other type of storage device or one or more subsets thereof for which it is desirable to determine relatively active and inactive portions thereof.

Figure 4C:
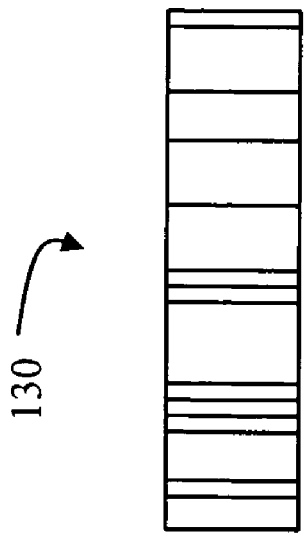
FIGS. 4A-4D are schematic diagrams illustrating dynamically altering subsections of memory for monitoring accesses thereto according to an embodiment of the system described herein.
Figure 4D:
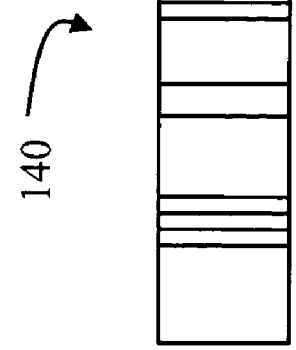
Figure 4A:
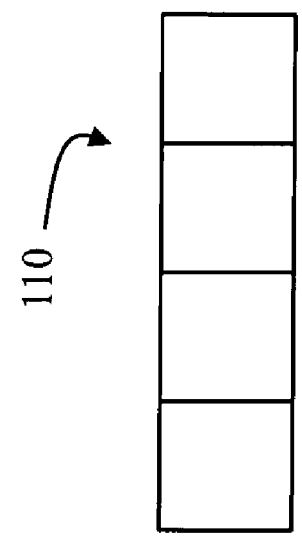

The diagram 110 of FIG. 4A represents a possible initial configuration of the system where the memory is initially subdivided into four equal sized subsections that are separately monitored for activity. Of course, any appropriate initial number of subsections, other than four, may be used. Initially, each of the subsections of the memory of FIG. 4A is monitored for the amount of activity thereon (accesses).

Figure 4B:
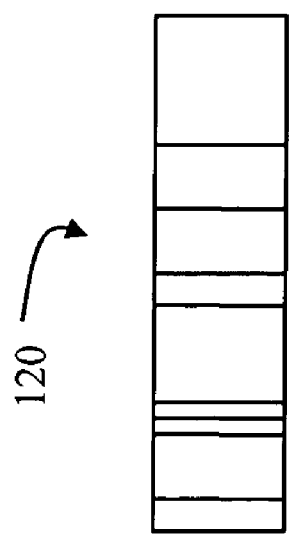

The diagram 120 of FIG. 4B illustrates a subsection configuration of the memory after some time has passed. Note that some of the subsections of the configuration illustrated by the diagram 110 have been further subdivided into additional subsections. As explained in more detail elsewhere herein, when there is a relatively large amount of activity at a particular subsection, that subsection is subdivided into additional subsections that are monitored separately.

Referring to FIG. 4C, a diagram 130 illustrates the memory at a point in time that is later than the memory illustrated by the diagram 120 of FIG. 4B. The memory shown in the diagram 130 of FIG. 4C is further subdivided into additional subsections that are separately monitored. In an embodiment herein, subsections may be further subdivided up to a minimum size. That is, a subsection that is at a predetermined minimum size may not be further subdivided. In an embodiment herein, the predetermined minimum size is one megabyte. In other embodiments, the minimum size may be larger or smaller (e.g., one gigabyte).

Referring to FIG. 4D, a diagram 140 illustrates the memory at a point in time that is later than the memory illustrated by the diagram 130 of FIG. 4C. The memory of the diagram 140 shows some of the subsections further subdivided but also shows other ones of the subsections having been merged. As explained in more detail elsewhere herein, in some cases subsections may be merged so that what had been two or more subsections becomes one subsection. In an embodiment herein, subsections may be merged when a table used to hold overhead information for the subsections fills up and when the merged subsections have a relatively low amount of activity associated therewith.

Referring to FIG. 5, a table 150 contains information for managing monitored subsections of memory according to the system described herein. The table 150 includes a header 152 and a plurality of elements 154-156. The header 152 may contain appropriate overhead information for the table 150. Each of the elements 154-156 corresponds to one of the monitored subsections and includes overhead information therefor, as described in more detail elsewhere herein. The elements 154-156 represent any appropriate number of elements and not just the three explicitly drawn.

In an embodiment herein, the table 150 is provided with a fixed, allocated, size. Thus, once the maximum number of elements are created (i.e., the maximum number of elements that will fit in the table 150), then a new element may be added to the table 150 by removing another element therefrom. In other embodiments, it is possible for the table may dynamically be made larger or smaller during run time and/or in connection with configuration operations. In addition, as discussed in more detail elsewhere herein, the elements 154-156 may be linked together in a tree-like hierarchy that facilitates managing the elements 154-156 and monitoring of the corresponding memory segment.

Referring to FIG. 6, the element 154 is shown in more detail as including a flag field 162, a score/average field 164, a pointers field 166, and an address(es) field 168. The element 154 illustrated in FIG. 6 is exemplary so that all of the other elements have a similar, if not identical, structure. Of course, each of the elements may have different values stored in each of the fields 162, 164, 166, 168.

The flag field 162 indicates whether the corresponding element 154 is a terminal element or a non-terminal element. As described in more detail elsewhere herein, the elements 154-156 may be interconnected in a tree-like structure (a tree) where some of the elements 154-156 are children of other ones of the elements 154-156. Elements with no children are terminal elements while elements with children are non-terminal elements. Manipulation and configuration of the elements 154-156 using a tree-like structure is discussed in more detail elsewhere herein.

The score/average field 164 is used to hold a score value (in the case of a terminal element) or an average value (in the case of a non-terminal element). A score value indicates a relative number of accesses per unit time for a subsection of monitored memory corresponding to the element 154. Determination of the score value is discussed in more detail elsewhere herein. An average value indicates the average of the score/average value of children of a non-terminal element. Thus, for example, if the element 154 is a non-terminal element having four children, then the value for the score/average field 164 is determined by adding together the score/average values for all of the children and then dividing the result by four.

The pointers field 166 is used by non-terminal elements to point to children elements. The address(es) field is used by terminal elements to point to one or more addresses (a range of addresses) of monitored subsections of the memory. Use and configuration of the pointer field 166 and the address(es) field 168 are discussed in more detail elsewhere herein.

Referring to FIG. 7, a tree-like data structure 170 (tree) is shown as being used for arranging a plurality of elements 172-184. For non-terminal elements of the tree 170 (e.g., the element 173), the pointers field 166 indicates the children elements (e.g., the elements 177-179 are the children of the element 173). The pointers field 166 may contain any appropriate indicator to designate the children, such as index/offset value(s) into the table 150 indicating the location in the table 150 of the children elements. As discussed elsewhere herein, the flag field 162 indicates if an element is terminal or not.

Each level of the tree 170 represents the entire memory that is being monitored. Thus, for example, the first level containing the elements 173-176 represent monitoring the entire memory, with each of the elements 173-176 corresponding to a specific fourth of the memory. Note that, in some cases, elements are shown with a ". . . " notation indicating any number of elements. Thus, for example, the elements 177-179 represent any number of elements, not just three elements drawn.

Each terminal element corresponds to a single subsection of the memory so that, for example, the element 174, represents monitoring a single subsection corresponding to a particular fourth of the memory. Each of the non-terminal elements represents monitoring as many subsections as the number of terminal element children of the non-terminal element. Thus, if a non-terminal element has sixteen children, nine of which are terminal, then the non-terminal element corresponds to monitoring nine subsections of the memory. As discussed elsewhere herein, the configuration of the tree 170 is dynamic, with subsections of the monitored memory being further subdivided while others are merged. In an embodiment herein, the maximum number of elements may be fixed because the size of the table 150 is fixed.

Figure 8:
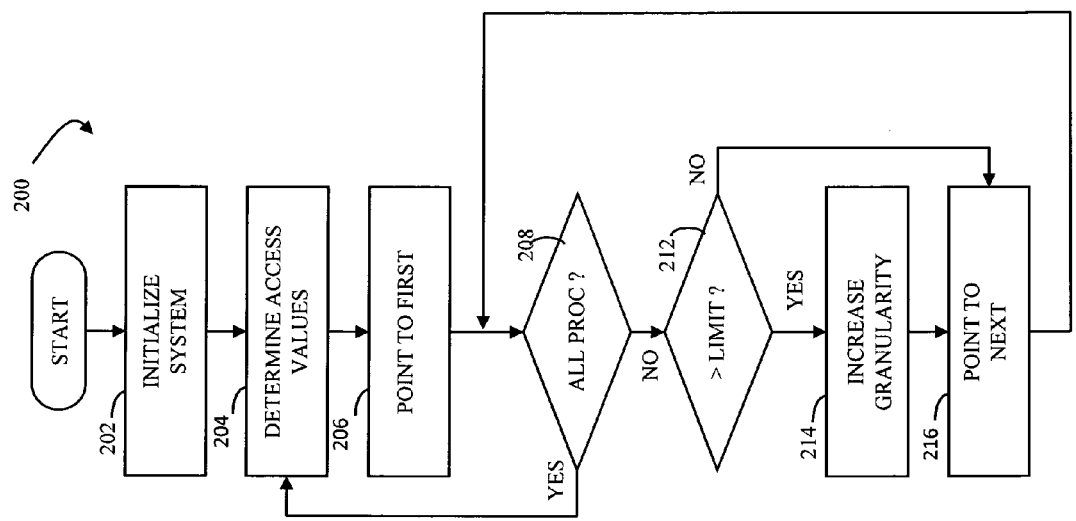
FIG. 8 is a flow chart illustrating steps performed in connection subdividing and merging subsections of memory for monitoring accesses thereto according to an embodiment of the system described herein.

Referring to FIG. 8, a flow chart 200 illustrates steps performed in connection with the system described herein. The processing described in connection with the flow chart 200, as well as other processing described herein, may be performed using any appropriate processor(s), including processor(s) provided on one or more of the directors 52a-52n, discussed above. A portion or all of the software may be provided in a computer-readable medium.

Processing begins at a first step 202, where the system is initialized. Initializing the system at the step 202 may include, for example, initializing the table 150 and configuring an initial tree structure and elements. In an embodiment herein, the tree is initialized to have a root with four children, where each of the children elements represents monitoring a fourth of the memory. Each of the children of the root is provided with four children of its own and each of those children is provided with four more children and so forth until all of the storage space in the table 150 is used. Thus, initialization may populate the entire table 150. Of course, other appropriate initial configurations are possible, including having a different number of children, not initially using all of the storage space of the table 150, etc.

Following the step 202 is a step 204 where access values are determined. In an embodiment herein, an access value is determined for each subsection of the memory corresponding to a terminal element and, from that, average values are calculated for each of the non-terminal elements. The score may be based on one or more of the following: number of data accesses, number of cache accesses, number of cache misses, number of read accesses, number of write accesses, ratio of read accesses to write accesses, and/or any other appropriate operational parameters that provide useful results. In some cases, it may be possible to use two or more operational parameters where the parameters are weighted. In addition, in an embodiment herein, scores from a previous iteration may be aged (e.g., multiplied by a value between zero and one) prior to adding new data thereto for a current iteration. For example, the score value may be halved prior to adding in the number of accesses occurring since that last iteration. Aging the score (as opposed to resetting the score entirely) allows the system to maintain historical data.

Of course, the factor used for aging and the type of aging may be adjusted to achieve a particular result desired by a user. The score for a subsection (and corresponding averages) may be modified each time an access occurs.

Following the step 204 is a step 206 where a pointer, used to iterate through all of the terminal elements, is set to point to a first one of the terminal elements. Following the step 206 is a test step 208 where it is determined if all of the terminal elements have been processed (i.e., the pointer has iteratively pointed to all of the terminal elements). If not, then control passes from the test step 208 to a test step 212 where it is determined if the score (from the score/average field 164) for the particular terminal element indicated by the pointer exceeds a predetermined limit. In an embodiment herein, the test at the step 212 uses the average value (from the score/average field 164 of the parent element) to determine if the score for a terminal element has exceeded the limit at the step 212. For example, the test at the step 212 may compare the score to four times the average value. In other embodiments, an average for the entire system, or a portion thereof, may be used. Note also that any appropriate limit may be used.

If it is determined at the step 212 that the limit has been exceeded, then control passes from the test step 212 to a step 214 where the granularity of the terminal element is increased so that the subsection of the memory that is monitored by the element will be further subdivided. Accordingly, more elements will be used for monitor accesses to the subsection of memory. Processing at the step 214 is discussed in more detail elsewhere herein. Following the step 214 is a step 216 where the pointer used to iterate through the terminal elements is incremented. Note that the step 216 may also be reached if it is determined at the step 212 that the score does not exceed the limit. Following the step 216, control transfers back to the step 208 to process the next terminal element. If it is determined at the test step 208 that all of the terminal elements have been processed, then control transfers back to the step 204 for another iteration.

Figure 9:
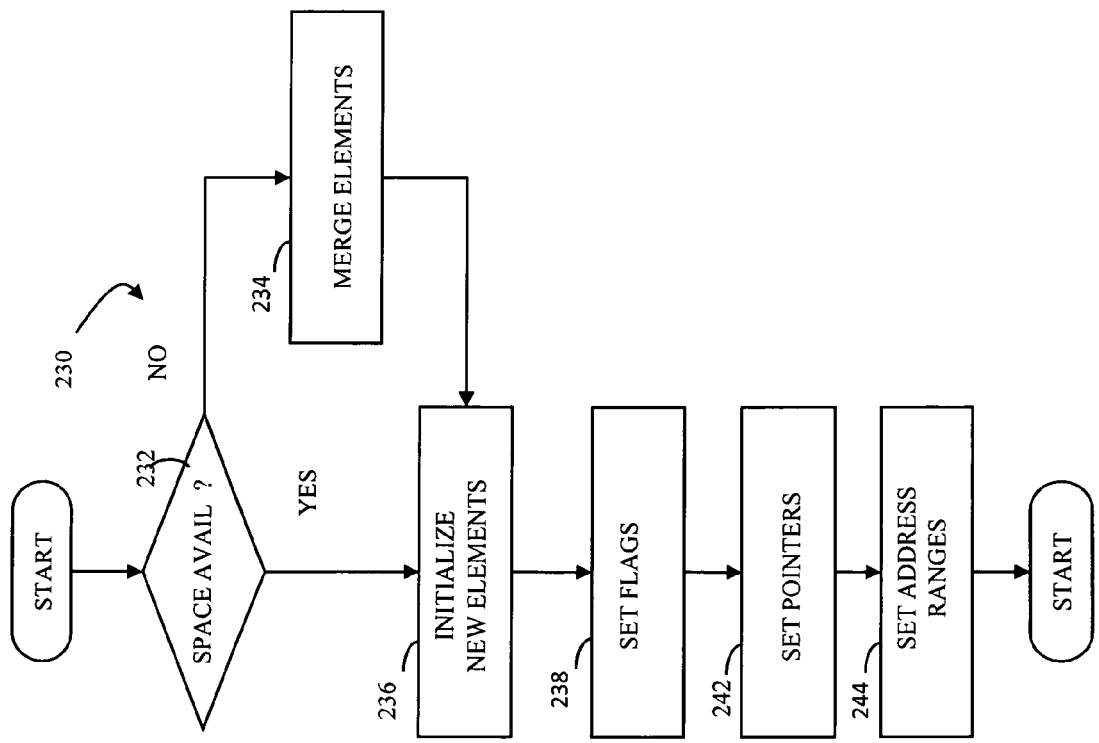
FIG. 9 is a flow chart illustrating adding subsections of memory for monitoring accesses thereto according to an embodiment of the system described herein.

Referring to FIG. 9, a flow chart 230 illustrates in more detail processing performed in connection with increasing the granularity of a terminal element at the step 214. In an embodiment herein, the granularity of a terminal element is increased by converting the terminal element to a non-terminal element having four terminal element children. Of course, it is possible to provide a different number of children, including a variable number that varies according to the magnitude of the difference between the score and the limit at the step 212, discussed above.

Processing begins at a first test step 232 where it is determined if there is available space in the table 150 to allocate additional elements to be used in connection with subdividing a subsection. Note that, in some cases, some of the table 150 may be unused and available for creating additional elements. In other embodiments, the table 150 is always maintained in a full state in which case the test at the step 232 is unnecessary since there will never be unused space in the table 150 available for providing new elements. If it is determined at the test step 232 that there is no available space in the table 150 for new elements, then control passes from the test step 232 to a step 234 where elements are merged to make additional space in the table 150. Merging elements at the step 234 is discussed in more detail elsewhere herein.

Following the step 234, or following the step 232 if it is determined there that there is available space in the table 150 for new elements, is a step 236 where the new elements are initialized (e.g., by allocating space from the table and making the space as used). In an embodiment herein, an expanded subsection is subdivided into four subsections. However, in other embodiments, it is possible to subdivide a subsection into any number of subsections. At the step 236, the four new elements are initialized (e.g., by marking the space in the table 150 as used and by possibly providing identifiers for the elements).

Following the step 236 is a step 238 where the flags are set for both the new elements as well as the element being subdivided. Subdividing causes the element that had been a terminal element to become a non-terminal element. Accordingly, the value of the flag field 162 of the element is adjusted accordingly. In addition, the values of the flag field 162 for the new elements are set to indicate that the new elements are terminal elements.

Following the step 238 is a step 242 where the value for the pointers field 166 of the element being subdivided is set to point to the new elements. Following the step 242 is a step 244 where the values for the address(es) field 168 of the new elements are set to portions of the addresses of the memory pointed to by the element being subdivided. For example, if the element being subdivided is used for monitoring accesses from address A to address B of the memory being monitored, then the addresses may be subdivided at the step 244 so that each of the new elements monitors one fourth of the address space between A and B. Following the step 244, processing is complete.

Figure 10:
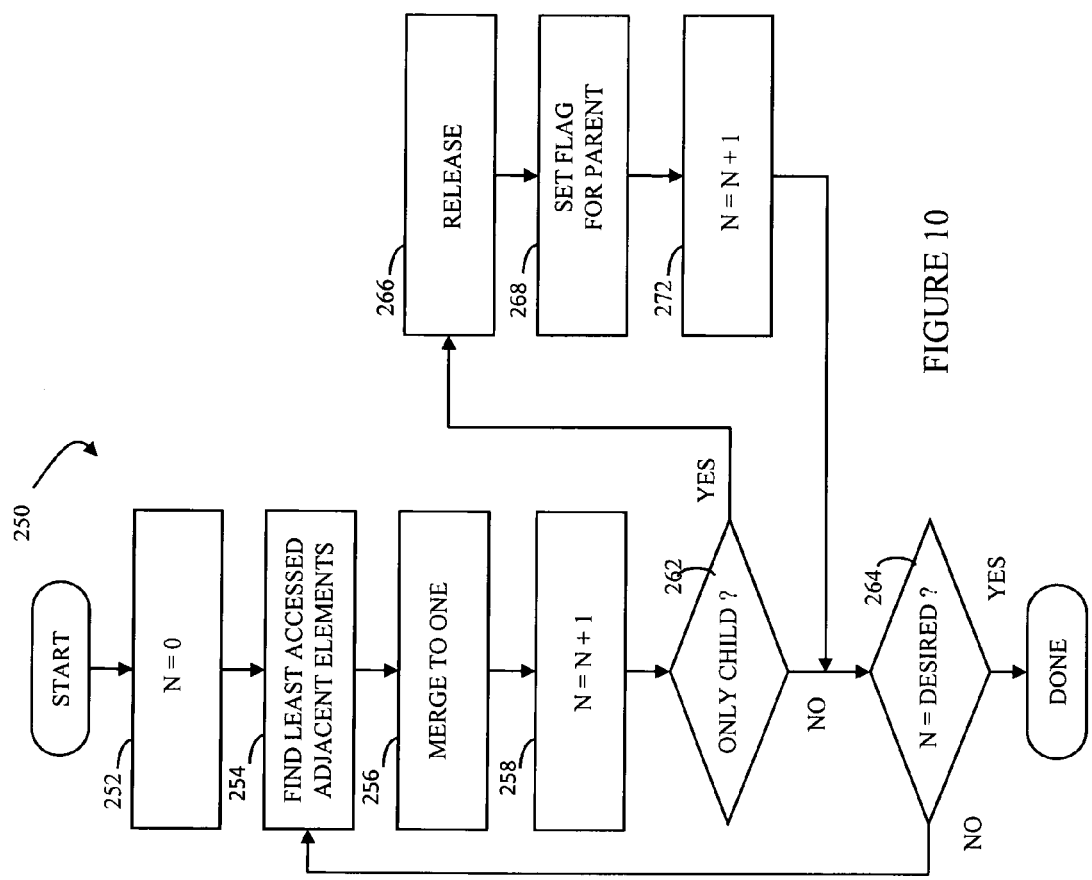
FIG. 10 is a flow chart illustrating removing subsections of memory for monitoring accesses thereto according to an embodiment of the system described herein.

Referring to FIG. 10, a flowchart 250 illustrates steps performed in connection with releasing storage space in the table 150 (merging elements). Processing begins at a first step 252 where N, a variable used for keeping track of the amount of storage space released, is initialized to zero. Following the step 252 is a step 254 where the two adjacent terminal elements having the lowest combined score are located. Processing at the step 254 may use any appropriate search technique, including iterating through the terminal elements and always saving the pair having the lowest combined access score.

Following the step 254 is a step 256 where the two elements are merged. Processing at the step 256 includes combining the values from the address field 168 for each into a first one of the elements and releasing the storage in the table 150 used by a second one of the elements. Following the step 256 is a step 258 where the variable used to keep track of the amount of released storage space, N, is incremented. Following the step 258 is a test step 262 where it is determined if the newly-merged element is an only child of the parent element. If not, then control transfers from the test step 262 to a test step 264 where it is determined if the variable N corresponds to the amount of desired free space. If so, then processing is complete. Otherwise, control transfers from the test step 264 back to the step 254 for another iteration.

If a terminal element is an only child with no siblings, then the child is monitoring the same address space of the memory as the parent. In such a case, the child can be eliminated so that the parent becomes a terminal element. Accordingly, if it determined at the test step 262 that the newly-merged element is an only child, then control transfers from the test step 262 to a step 266 where the memory of the table 150 is released for use. Following the step 266 is a step 268 where the value of the flag field 162 is set to indicate that the former parent is now a terminal element. Following the step 268 is a step 272 where the variable N is incremented. Following the step 272, control transfers to the step 264, discussed above, to determine if N indicates that the desired amount of memory has been released.

In some embodiments, a separate process may be used to shrink levels by releasing all of the terminal elements coupled to a particular parent and then converting the parent to a terminal element. Such a process may run instead of, or in addition to, the other processing discussed herein for releasing space in the table 150 and may be synchronous or asynchronous with respect to other processes discussed herein.

Figure 11:
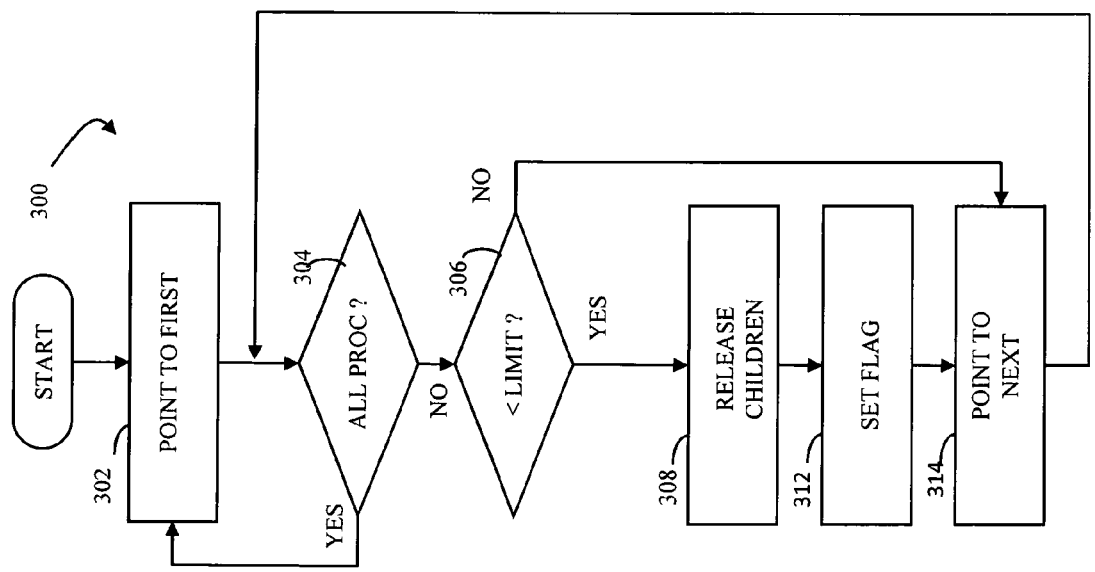
FIG. 11 is a flow chart illustrating removing subsections of memory for monitoring accesses thereto according to an alternative embodiment of the system described herein.

Referring to FIG. 11, a flow chart 300 illustrates steps performed in connection with a process that eliminates elements corresponding to lightly-accessed sections by removing all of the terminal children of a parent element to convert the parent element into a terminal element. Processing begins at a first step 302 where a pointer is initialized. In an embodiment herein, the pointer is used to point to each of the elements having terminal element children. Following the step 302 is a test step 304 where it is determined if all such elements have been processed. If so, then control transfers from the test step 304 back to the step 302 to begin another iteration.

If it is determined at the test step 304 that all elements have not been processed, then control transfers from the step 304 to a test step 306 where it is determined if the value in the score/average field 164 of the current element (the average of the children terminal elements) is less than a predetermined limit. Note that the limit used at the test step 306 is probably different (much less) than the limit used at the test step 212, discussed above. In an embodiment herein, the limit may be set to one eighth of the average value of all elements at the same level (provided by the parent element).

If it is determined at the test step 306 that the score/average is less than the predetermined limit, then control transfers from the test step 306 to a step 308 where the memory in the table 150 corresponding is released. Following the step 308 is a step 312 where the value of the flag field 162 is set to indicate that the former parent is now a terminal element. Following the step 312 is a step 314 where the pointer is incremented. Note that the step 314 is also reached from the test step 306 if the score/average is not less than the limit. Following the step 314, control transfers back to the step 304 to process the next element.

The system described herein is useful for monitoring memory accesses. In an embodiment herein, there may be different types of available physical memory, including relatively fast (but relatively expensive) physical memory and relatively slow (but relatively inexpensive) physical memory. Monitoring memory accesses as described herein allows for moving data that is accessed frequently to the relatively fast memory and moving data that is accessed less frequently to the relatively slow memory. Arranging storage this way allows for improved system performance. Note that adjusting and accounting for physical memory locations is well known in the art and thus will not be discussed in detail herein. Generally, logical storage devices include one or more physical storage devices and a mapping mechanism therebetween.

Figure 12:
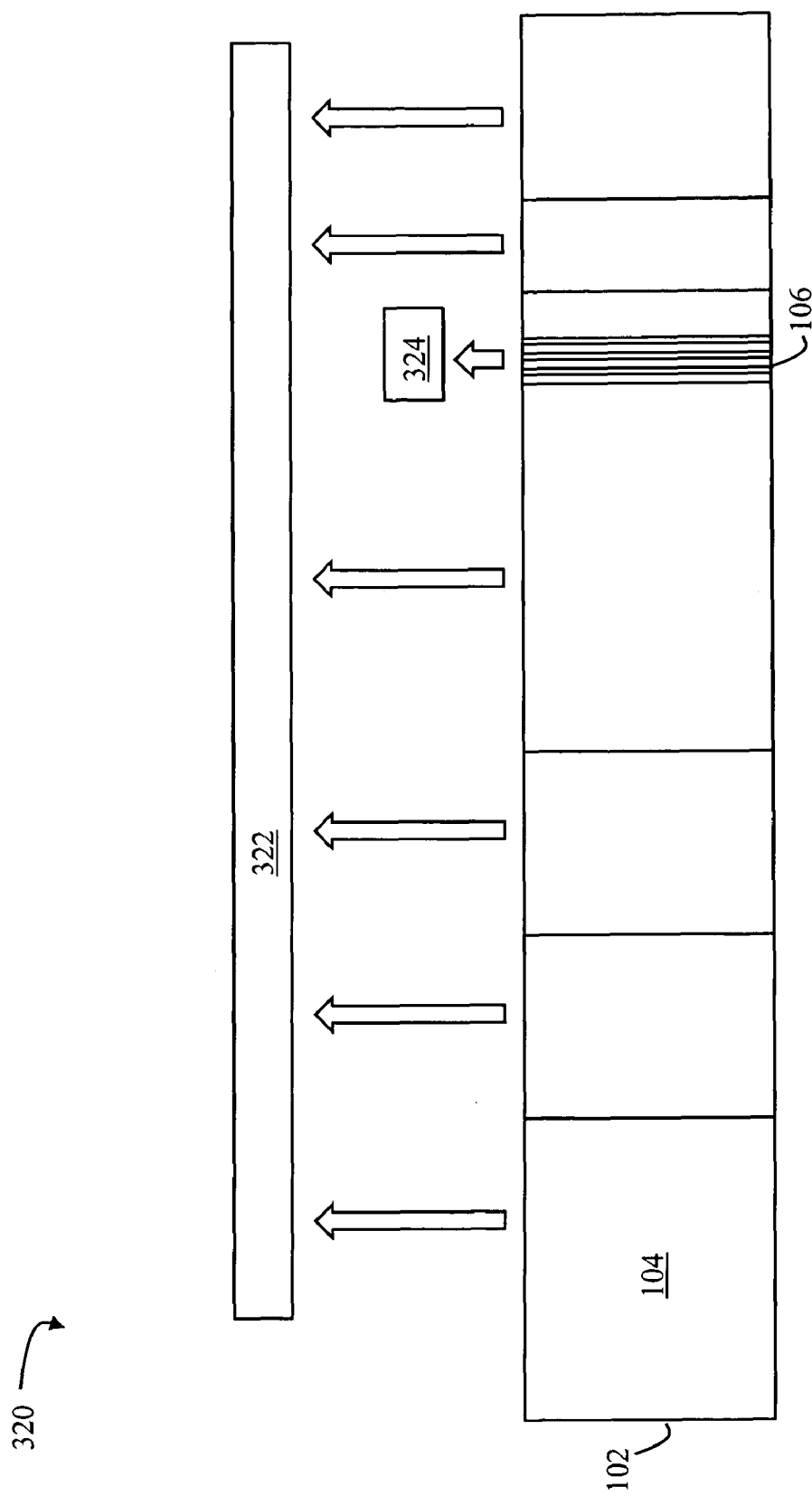
FIG. 12 is a schematic diagram illustrating a memory divided into subsections for monitoring accesses thereto and a mapping of the subsections into slower or faster physical memory according to an embodiment of the system described herein.

Referring to FIG. 12, a diagram 320 shows the memory 102 of FIG. 3, discussed above, being mapped to a first physical memory 322 and a second physical memory 324. The first physical memory 322 is relatively slow, but also relatively inexpensive while the second physical memory 324 is relatively fast but also relatively expensive. As illustrated by the diagram, the portion of memory 106 that has been subdivided more than the rest of the memory 102 (and thus accessed more frequently than the rest of the memory 102) is mapped to the relatively fast physical memory 324 while the remainder of the memory 102 is mapped to the relatively slow physical memory. In an embodiment herein, the relatively fast physical memory 324 may be implemented using flash memory while the relatively slow physical memory 322 may be implemented using SATA disk drives. The relatively fast physical memory 324 and the slow physical memory 322 represent different tiers of physical memory. Moving data from a relatively slow physical memory to a relatively fast physical memory may be referred to as promotion while moving data from a relatively fast physical memory to a relatively slow physical memory may be referred to as demotion.

Figure 13:
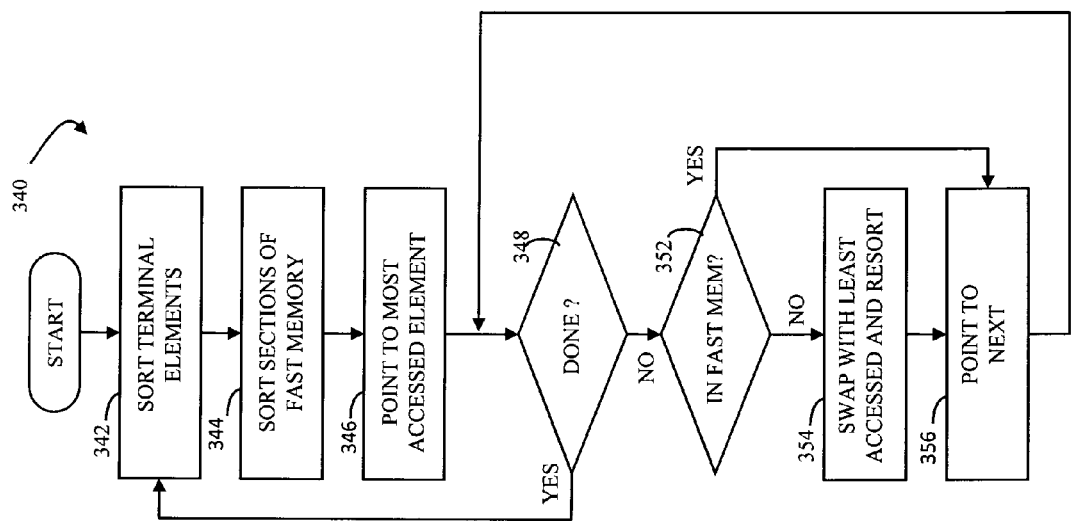
FIG. 13 is a flow chart illustrating processing performed in connection with mapping subsections of a memory into slower or faster physical memory according to an embodiment of the system described herein.

Referring to FIG. 13, a flow chart 340 illustrates a process for mapping subsections that are accessed relatively frequently to a relatively fast physical memory and vice versa. The processing illustrated by the flow chart 340 may be run in conjunction with other processing discussed herein or may be asynchronous thereto. Processing begins at a first step 342 where the terminal elements are sorted in order of the score thereof (i.e., accesses per unit time). Following the step 342 is a step 344 where the sections of fast memory are sorted in order of accesses per unit time. The sorted lists provided by the step 342, 344 are useful for the remaining of the processing illustrated by the flow chart 340. Note that the scores may be normalized based on the size (amount of memory) for each of the subsections so that two subsections with the same score will be treated differently if the subsections represent a different amount of memory. Following the step 344 is a step 346 where a pointer that iterates through the sorted list provided by the step 342 is set to point to the first element thereof.

Following the step 346 is a test step 348 where it is determined if processing for the particular iteration is complete. The test at the step 348 may determine if the pointer used for the iteration is pointing to the least accessed section in the fast memory (i.e., the fast physical memory contains all of the subsections that are accessed most frequently). If it is determined at the test step 348 that processing for the iteration is complete, then control transfers from the test step 348 back to the step 342 to begin another iteration. Otherwise, control transfers from the test step 348 to a test step 342 where it is determined if the element pointed to by the iteration pointer is in fast memory. If not, then control transfers from the test step 352 to a step 354 where the memory subsection is swapped with the least accessed subsection in the fast memory and the list of subsections in the fast memory (initially provided at the step 344) is resorted. Following the step 354 is a step 356 where the pointer is set to point to the next element. Note that the step 356 is also reached from the step 352 if the data is already mapped to the fast memory. Following the step 356, control transfers back to the step 348, discussed above, to check the next element pointed to by the iteration pointer.

The system described herein may use any appropriate algorithm/technique to arrange the storage based on access information. In some cases, the access data may be manipulated off-line to obtain useful information. In addition, it may be possible to anticipate usage based on historical access information. For example, data for a particular database may become especially active on weekdays between 9:00 a.m. and 5:00 p.m. and otherwise may be relatively inactive. In such a case, it may be possible to pre-configure the subsections prior to 9:00 a.m. based on expected usage.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and FIG. 2 or may be implemented using a platform that is somewhat or even completely different from any particular platform described herein. Note that the system described herein may be implemented using more than two tiers of physical memory.

Although the system described herein uses tracks as a unit of data for certain purposes, it should be understood that other units of data (including, possibly, variable length units of data) may be used. This also applies to other data structures and data units. In addition, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system operates with any snapshot mechanism not inconsistent therewith. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of measuring access rates of a computer memory, comprising:
    subdividing the memory into subsections;
    monitoring access rates for each of the subsections;
    in response to a subsection having a relatively high access rate, subdividing the subsection into multiple subsections that are separately monitored;
    in response to at least two adjacent subsections having a relatively low access rate, merging the at least two subsections into a single subsection; and
    maintaining a plurality of elements that correspond to the subsections, wherein the elements are arranged in a tree-like structure, wherein each of the elements includes identifying information of at least one of the subsections and further includes overhead information used in monitoring the at least one of the subsections, wherein a terminal element of the plurality of elements corresponds to one of the subsections and a non-terminal element of the plurality of elements corresponds to a plurality of the subsections, wherein, using the overhead information, an access value is determined for each of the subsections of the memory corresponding to terminal elements and an average access value is determined for the subsections of the memory corresponding to non-terminal elements, the average access value for each non-terminal element being calculated based on an average of the access values of the terminal elements branching from each non-terminal element, wherein the access values and average access values are used in the monitoring of the access rates, and wherein granularity of the monitoring of the access rates is controlled by converting between the terminal elements and the non-terminal elements.

2. A method, according to claim 1, wherein monitoring access rates includes monitoring at least one of the following operational parameters used to generate the overhead information: number of data accesses, number of cache accesses, number of cache misses, size of access in bytes, number of read accesses, number of write accesses, and ratio of read accesses to write accesses.

3. A method, according to claim 2, wherein two or more operational parameters are used and wherein the operational parameters are weighted.

4. A method, according to claim 1, wherein merging the subsections includes combining elements and combining information indicating a portion of computer memory from each element that is being combined.

5. A method, according to claim 1, wherein subdividing the subsection includes creating new elements each having information indicating a portion of computer memory corresponding to the subsection that is based on information indicating the portion of computer memory corresponding to the subsection from the element being subdivided.

6. A method of arranging data in a computer memory, comprising:
    providing at least two types of memory for the computer memory, wherein one of the types is relatively fast and another one of the types is relatively slow;
    moving data that is accessed relatively frequently from the relatively slow memory type to the relatively fast memory type;
    moving data that is accessed relatively infrequently from the relatively fast memory type to the relatively slow memory type;
    measuring data access rates to determine data that is accessed relatively frequently and relatively infrequently, wherein measuring data access rates includes subdividing the memory into subsections, monitoring access rates for each of the subsections, in response to a subsection having a relatively high access rate, subdividing the subsection into multiple subsections that are separately monitored, and, in response to at least two adjacent subsections having a relatively low access rate, merging the at least two subsections into a single subsection; and
    maintaining a plurality of elements that correspond to the subsections, wherein the elements are arranged in a tree-like structure, wherein each of the elements includes identifying information of at least one of the subsections and further includes overhead information used in monitoring the at least one of the subsections, wherein a terminal element of the plurality of elements corresponds to a one of the subsections and a non-terminal element of the plurality of elements corresponds to a plurality of the subsections, wherein, using the overhead information, an access value is determined for each of the subsections of the memory corresponding to terminal elements and an average access value is determined for the subsections of the memory corresponding to non-terminal elements, the average access value for each non-terminal element being calculated based on an average of the access values of the terminal elements branching from each non-terminal element, wherein the access values and average access values are used in the monitoring of the access rates, and wherein granularity of the monitoring of the access rates is controlled by converting between the terminal elements and the non-terminal elements.

7. A method, according to claim 6, wherein monitoring access rates includes monitoring at least one of the following operational parameters used to generate the overhead information: number of data accesses, number of cache accesses, number of cache misses, size of access in bytes, number of read accesses, number of write accesses, and ratio of read accesses to write accesses.

8. A method, according to claim 6, wherein two or more operational parameters are used and wherein the operational parameters are weighted.

9. A method, according to claim 6, wherein merging the subsections includes combining elements and combining information indicating a portion of computer memory from each element that is being combined.

10. A method, according to claim 6, wherein subdividing the subsection includes creating new elements each having information indicating a portion of computer memory corresponding to the subsection that is based on information indicating the portion of computer memory corresponding to the subsection from the element being subdivided.

11. A non-transitory computer-readable medium storing computer software that measures access rates of a computer memory, the software comprising:
- executable code that subdivides the memory into subsections;
- executable code that monitors access rates for each of the subsections;
- executable code that subdivides the subsection into multiple subsections that are separately monitored in response to a subsection having a relatively high access rate; and
- executable code that merges at least two subsections into a single subsection in response to the at least two adjacent subsections having a relatively low access rate;
- executable code that maintains a plurality of elements that correspond to the subsections, wherein the elements are arranged in a tree-like structure, wherein each of the elements includes identifying information of at least one of the subsections and further includes overhead information used in monitoring the at least one of the subsections, wherein a terminal element of the plurality of elements corresponds to one of the subsections and a non-terminal element of the plurality of elements corresponds to a plurality of the subsections, wherein, using the overhead information, an access value is determined for each of the subsections of the memory corresponding to terminal elements and an average access value is determined for the subsections of the memory corresponding to non-terminal elements, the average access value for each non-terminal element being calculated based on an average of the access values of the terminal elements branching from each non-terminal element, wherein the access values and average access values are used in the monitoring of the access rates, and wherein granularity of the monitoring of the access rates is controlled by converting between the terminal elements and the non-terminal elements.

12. The non-transitory computer readable medium according to claim 11, wherein the executable code that monitors access rates monitors at least one of the following operational parameters used to generate the overhead information: number of data accesses, number of cache accesses, number of cache misses, size of access in bytes, number of read accesses, number of write accesses, and ratio of read accesses to write accesses.

13. The non-transitory computer readable medium according to claim 12, wherein two or more operational parameters are used, and wherein the operational parameters are weighted.

14. The non-transitory computer readable medium according to claim 11, wherein the executable code that merges the subsections includes executable code that combines elements and combines information indicating a portion of computer memory from each element that is being combined.

15. The non-transitory computer readable medium according to claim 11, wherein the executable code that subdivides the subsection includes executable code that creates new elements each having information indicating a portion of computer memory corresponding to the subsection that is based on information indicating the portion of computer memory corresponding to the subsection from the element being subdivided.

* * * * *